No. 883,449. PATENTED MAR. 31, 1908.
W. R. CAMPBELL.
DIFFERENTIAL DRAFT APPLIANCE.
APPLICATION FILED FEB. 11, 1907.
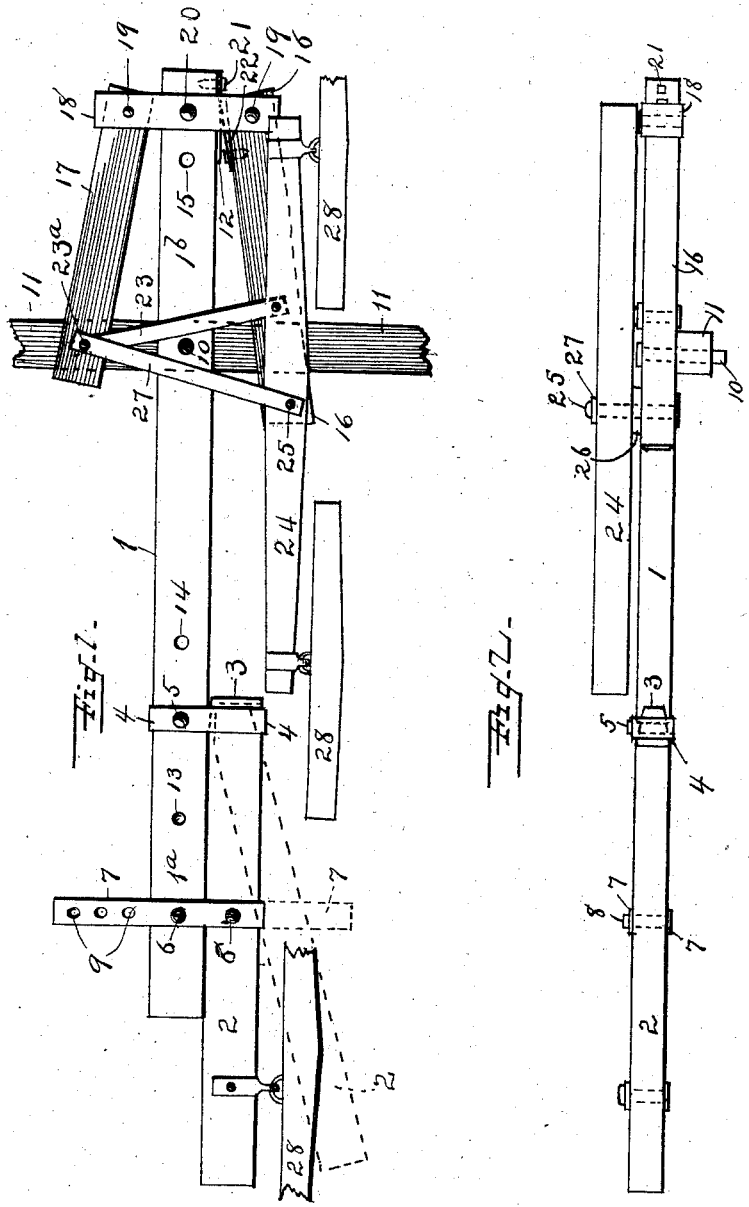
WITNESSES:
INVENTOR:
William R. Campbell,
By H. M. Richards,
Atty.

UNITED STATES PATENT OFFICE.

WILLIAM R. CAMPBELL, OF LITTLE YORK, ILLINOIS.

DIFFERENTIAL-DRAFT APPLIANCE.

No. 883,449.　　　　　Specification of Letters Patent.　　　Patented March 31, 1908.

Application filed February 11, 1907. Serial No. 356,838.

*To all whom it may concern:*

Be it known that I, WILLIAM R. CAMPBELL, a citizen of the United States, residing at Little York, in the county of Warren and State of Illinois, have invented a new and useful Differential-Draft Appliance, of which the following is a specification.

The present invention has relation to or concerns differential draft appliances or three horse eveners, and particularly to that type or character thereof which are illustrated and described in my patent for draft equalizers bearing date of January 22nd, 1907, Number 841,930, and in my co-pending application for patent for the same, Serial Number 351,758; and the main objects of the invention are to improve the constructions and operations of the devices shown and set forth in said patent and application for patent.

The prime factor of the present invention rests in an auxiliary or extension bar secured to the main evener bar or lever in such manner that it may be readily, quickly and easily adjusted to a position whereby the single horse attached thereto may be placed forwardly of, even with or in rear of the team hitched to the doubletree.

A further object is to provide means connecting the main and the auxiliary bar whereby they may be without the employment of tools engaged with or disengaged from each other.

Another object of the invention is to provide for or prevent wear of certain parts of the device, while a still further object is to prevent "creeping" of one of the divergent compensating arms longitudinally of the main bar to which it is attached.

Other objects will presently appear as the nature of the invention is better understood.

With these objects in view the invention consists in the construction, combination and arrangement of parts hereinafter fully described, illustrated and claimed.

In order to enable the invention to be better understood and more easily carried into practice I have appended hereunto drawings, in which I have fully illustrated the nature of said improvements.

In said drawings: Figure 1 is a top plan, showing also a fragment of a vehicle or machine tongue; and Fig. 2 is a front elevation.

Referring now to said drawings by numerals, the same one designating the same part in the different figures thereof, 1 indicates the main equalizing or evener bar, comprising a longer arm or member $1^a$ and a shorter arm or member $1^b$, and 2 represents the auxiliary or extension bar, which is tapered as shown at its proximate end 3 whereby it may be slipped into the strap or keeper 4 which is secured to the bar 1 by a bolt or pin 5. Secured to the bar 1 by a bolt or pin 6 are extension or adjusting straps 7, the forward portions of which are apertured for the reception of a clevis pin 8 or the like which passes also through the bar 2. In its normal position the bar 2 parallels the bar 1, as shown by full lines at Fig. 1, but when, for a reason hereinafter described, it becomes necessary to move the adjusting straps 7 forwardly, whereby one of the apertures 9 is brought into engagement with the pin 6, the bar 2 will be thrown into approximately the dot line position shown at same figure, the extent or degree of divergence being of course governed by the aperture being employed. It will be evident that upon the pin 6 being withdrawn, the bar 2 may be slipped longitudinally of the bar 1 and released from its engagement with the keeper 4. Replacement is effected in a reverse manner.

At the imaginary point of juncture of the longer and shorter members of the main bar 1 is an aperture for the reception of a clevis pin or bolt 10 which passes also through the draft pole 11 in the ordinary manner and whereby it is fulcrumed thereon. In the event of the device being employed in connection with a plow or other machine or vehicle not provided with a tongue, a clevis (not shown) is interposed in an evident manner. Near the outer end of its member $1^b$ the bar 1 is provided with a wear or rub plate 12. Also, it is apertured at 13, 14, 15 for purposes presently set forth. Divergent or set-off compensating arms 16, 17 are located respectively in front and rear of the member $1^b$ of the main evener bar. A yoke 18 passes around the outer ends and the end of said main bar member, and is pivoted to each arm by a bolt 19 and pivoted preferably by a clevis pin 20 to said bar. To prevent the arm 16 from creeping endwise of the member $1^b$ I provide a bolt or screw 21 having an enlarged head, which head the plate 12 takes against and which bolt serves the further purpose of retaining the said plate in place. This construction provides a simple and efficient means of preventing the natural tendency of the forward bar to work toward the outer end of the main bar and impair the efficiency of the device. The arm 16 is also provided with a wear plate 22 as shown best at Fig. 1, for an evident purpose. Straps 23 are fixed to and connect the inner ends of the arms 16 and 17 in the same manner as in my aforenamed application, in which the arms were shown as being equal in length. In the present construction I have extended the arm 16 to project over the draft pole so that it cannot possibly abut thereagainst in the event of its end contiguous thereto sagging, and have shortened the rear arm so that all danger of its striking the hounds of a wagon, fertilizer distributer or like wheeled vehicle or machine is eliminated.

The usual doubletree 24 is pivoted above and to the forward arm 16 by means of a clevis pin or bolt 25 in an ordinary manner, and is separated therefrom by means of a washer or friction plate 26. A hammer strap 27 connects the pin 25 with a strap pin 23ª in the same manner as shown and described in my application, and performs the same function in the same way. It, therefore, need not be further herein described. By positioning the hammer strap on the opposite side from where shown, and turning the evener end-for-end and over, it is reversible or changed from a right to a left hand device, or in other words, the relative positions of the swingle and doubletrees will be opposite to that shown in the drawings. Swingletrees 28 are swiveled or otherwise attached in any suitable manner to the doubletree and a single one to the extension bar in a like manner. The mode or manner of attachment of the draft animals thereto is the ordinary and well known one.

The operation of the compensating arms and other moving parts connected with the shorter member of the main bar or differential lever has been fully described in my patent and application before referred to and need not be herein narrated. It will be evident that the animals hitched to the doubletree "straddle" or are on opposite sides of the pole, and that the single one drawing on the swingletree attached to the extension or auxiliary bar 2 is in front of one of the wheels of the vehicle or machine—the right hand one as shown in the drawings. Should the last named animal be prompt and willing to perform his share of the labor, the strap 7 is moved forwardly as shown by dot lines at Fig. 1, and the pin 6 dropped through one of the rear holes 9, whereby said animal will be thrown further from the point of draft, but if he be indifferent or lazy, or if he be not so powerful as one of the team drawing on the doubletree, the strap is set where shown, whereby he will be placed closer to the draft point and be given increased power, it being understood that the closer the draft animal is hitched to the machine or vehicle, the more force will he be able to exert. In narrow driveways, as, for instance, those in elevators, it is impossible to use an equalizer of ordinary dimensions. It will be clear that this objection is met in the employment of the present device by simply withdrawing the clevis pin which couples the auxiliary to the main bar, slipping the former from the keeper and proceeding in an evident manner to draw the load by the team hitched to the doubletree. The operations of the parts of the device have been described hereinbefore or in my patent and application for patent aforenamed.

Having thus described my improvements in connection with other features relating to the invention, I desire to claim as new and secure by Letters Patent the following, to wit:—

1. An equalizer including a main bar having unequal arms, divergent and like compensating arms pivoted at the outer end of the shorter arm, a yoke in which said connection is made, an auxiliary equalizer bar pivoted to the longer arm of the main bar, and selective means whereby its outer end may be caused to diverge therefrom.

2. An equalizer including a main bar having unequal arms, divergent and like compensating arms yoked to and extending along the sides of the shorter arm, an extension bar at the other end of the main bar, selective means for pivoting it thereto at its midlength whereby its outer end may be caused to diverge therefrom, and a loop into which its inner end is adapted to slip freely.

3. In an equalizer including a main bar having unequal arms, divergent compensating arms connected thereto at the end of the shorter arm, one on each side thereof, an extension bar at the other end of the main bar, a loop with which one end of the extension bar is adapted to be loosely engaged, and selective means for pivotally connecting said extension bar for causing its free end to diverge from the main bar.

4. In a device of the character described, a main evener bar, a wear plate thereon near the end of its shorter arm, and compensating arms, one of which includes a wear plate adapted to take against the aforesaid plate.

5. In a device of the character described, compensating arms, a main evener bar to which they are pivoted, and means fixed to said bar whereby endwise movement of one of said arms is prevented.

6. In a device of the character described, a main evener bar, a wear plate near the end of its shorter arm, compensating arms pivoted to said bar, a wear plate on one of them, and means fixed to said bar for preventing endwise movement of one of said arms.

In testimony whereof I have hereunto signed my name in the presence of two attesting witnesses, at Galesburg, in the county of Knox and State of Illinois, this 1st day of February, 1907.

WILLIAM R. CAMPBELL.

Witnesses:
 J. L. BURKHATTER,
 H. M. RICHARDS.